United States Patent [19]
Hiscock et al.

[11] Patent Number: 6,145,010
[45] Date of Patent: Nov. 7, 2000

[54] METHOD AND APPARATUS FOR BANDWIDTH CONTROL IN AN OVER SUBSCRIBED COMPUTER NETWORK SWITCH

[75] Inventors: James Scott Hiscock, Rockport; Carl Lindeborg, Shrewsbury; David Stoner, Sudbury, all of Mass.

[73] Assignee: 3Com Corporation, Santa Clara, Calif.

[21] Appl. No.: 09/114,975

[22] Filed: Jul. 14, 1998

[51] Int. Cl.[7] ............................. G06F 13/00; H04L 12/56
[52] U.S. Cl. .................... 709/238; 709/104; 370/412; 370/428
[58] Field of Search ............................ 709/102, 103, 709/104, 223, 224, 225, 230, 232, 233, 234, 235, 238, 237; 370/229, 230, 231, 235, 236, 360, 395, 412, 428

[56] References Cited

U.S. PATENT DOCUMENTS

| | | | |
|---|---|---|---|
| 5,777,984 | 7/1998 | Gun et al. ............................. | 370/230 |
| 5,790,545 | 8/1998 | Holt et al. ............................ | 370/398 |
| 5,793,747 | 8/1998 | Kline .................................... | 370/230 |
| 5,838,681 | 11/1998 | Bonomi et al. ....................... | 370/395 |
| 6,006,264 | 12/1999 | Colby et al. .......................... | 709/226 |

Primary Examiner—Viet D. Vu
Attorney, Agent, or Firm—McGlew and Tuttle, P.C.

[57] ABSTRACT

A switch of a computer network with a plurality of dual speed Ethernet client ports and at least one high speed Ethernet uplink port. The combined data rate of the Ethernet dual speed client ports has a maximum value which is higher than the data rate of the Ethernet uplink port. The Bandwidth Control limits the number of enabled Ethernet client ports so that the combined data rate of the enabled client ports substantially equals, or slights exceeds the data rate of the uplink port. In this way the speed and amount of switch memory can be minimized in the switch itself and the memory burden is divided among the clients. The dividing of the memory burden greatly reduces the worst case scenario and allows each client to individually chose the speed and amount of memory based on its own cost/benefit situation.

25 Claims, 3 Drawing Sheets

METHOD AND APPARATUS FOR BANDWIDTH CONTROL IN AN OVER SUBSCRIBED COMPUTER NETWORK SWITCH

FIELD OF THE INVENTION

The present invention relates to computer network switches which can receive data at a rate faster than it can transit the data. In particular, the present invention relates to a switch which provides a plurality of Ethernet client ports at a first rate and an Ethernet uplink port at a second rate, where the combined data rate of the Ethernet client ports is larger than the data rate of the Ethernet uplink port.

BACKGROUND OF THE INVENTION

A switch has a plurality of ports which receive data in the form of packets. The switch stores the data in the switch memory and analyzes the data to determine through which port the packet should be sent out. In this way data is routed from one workstation to another without having to be sent to all the workstations on a computer network. Very often a situation arises where there is a lot of data from either individual workstations or Local Area Networks (LAN) which are destined for a same or substantially similar distant location. In such situations, the individual stations or LAN's are connected to separate client ports of a blocking switching. The blocking switch then has an uplink port with a link to that part of a network to which the large amount of data is to be sent. The uplink port has a data rate which is larger than the individual data rates of the client ports. However, the combined data rate of all of the client ports put together is larger than the data rate of the uplink port. This often occurs because in ordinary situations not all of the client ports are continuously receiving data.

Inside the switch, there is a switch memory. The data from the client ports go to the switch memory and the switch has a processor which determines through which port the data is sent out. When that port is able to transmit the data, the data is moved by the processor from the switch memory to the output port and then transmitted out of the port.

In a worst case scenario, it is possible for all the client ports to be simultaneously receiving data at a particular instant. This often happens in short bursts during normal operation. The switch memory therefore needs to be large and fast enough to temporarily store these large bursts of incoming data until the incoming data rate slows down and the outgoing data rate is able to catch up and remove the excess data.

If the switch memory is not large and fast enough to hold all of the data in a worst case scenario, data will be lost during exceptionally high traffic operation of the switch. This is clearly disadvantageous, since dropped or lost data will most likely corrupt a much larger operation between two workstations, and require a re-sending of much more data than was originally lost. Adding large and fast quantities of memory to a switch is expensive and is often not economically justifiable when only used during the infrequent occurrences of worst case scenarios.

SUMMARY AND OBJECTS OF THE INVENTION

It is a primary object of the present invention to reduce the size and speed of the switch memory to an amount that would be sufficient for average operation without dropping or losing data during high traffic periods.

The present invention accomplishes this object by enabling and disabling the data transfer of the client ports and correspondingly preventing the clients connected to the disabled ports from transmitting data to the disabled ports. Herein after, enabling and disabling of the ports refers to the data transfer ability. In essence, the present invention is shifting the burden of compensating for bottlenecks back to the client. The client is often better equipt to handle a back log since it usually has large amounts of memory and may even be able to reduce the rate at which it generates data.

The switch of the present invention has a plurality of ports, and a switch memory means is for storing data received from the ports. Each of the ports has an Ingress Function means associated with each of the ports. The Ingress Function means associated with the port controls and monitors data from the associated port to the switch memory means. A Bandwidth Control means oversees all of the Ingress Function means. The Bandwidth Control means determines how many ports can be enabled at any one time, and can also determine which ports must be always enabled. The Bandwidth Control means selectively enables and disables the Ingress Function means of those ports which can be disabled in a regular, or algorithmic order, such as round robin.

The Ingress Function means, when receiving a disabled signal from the Bandwidth Control means, finishes receiving the packet of data that is currently being received, and then transmits a "finished" or "done" signal to the Bandwidth Control means. The Bandwidth Control means only maintains an Ingress Function Means or port enabled for a predetermined time. After this predetermined time has expired, the Bandwidth Control means sends a disabled signal to the Ingress Function, or a timer in the Ingress Function means causes the Ingress Function means to disable itself. Once the Ingress Function means is to be disabled, the Ingress Function means exerts a back pressure on the client connected to the associated port.

The client receiving the back pressure then stops transmitting data to the port. Once the Ingress Function means recognizes that no more data is being sent to the port, the Ingress Function means generates the "done" or "finished" signal to the bandwidth control means. Once the Bandwidth Control means receives a "finished" signal, the Bandwidth Control means recognizes that the port will no longer transfer data into the system memory, and the Bandwidth Control means then chooses another port to be enabled and begin transferring data to the system memory for a predetermined time. The Bandwidth Control means then steps through all of the ports in this manner to give each of the ports access to the system memory, and to limit the number of ports accessing the system memory to below a predetermined number. In this way, the Bandwidth of the switch is not exceeded, and the switch memory means will not overrun or overflow.

In certain situations, there may be clients which should not be prevented from transferring data to the system memory. The Bandwidth Control means recognizes this and takes this into consideration when determining the predetermined number of ports that can be enabled at one time. It is also possible that some clients have a higher priority than other clients. Therefore the Bandwidth Control means uses a weighted order in selecting the ports to be enabled after the predetermined time has expired for the presently enabled ports. This gives some clients access at a higher rate than other clients.

The Bandwidth Control means can also vary a magnitude of the predetermined time, and/or the predetermined number of enabled ports based on conditions of the switch memory means. Changes in conditions could occur when ports that are always enabled, are not constantly transmitting data to the switch memory means. Other changes and conditions could occur by the connection or disconnection of the ports to and from additional clients. The Bandwidth Control means is able to sense the operation of the switch memory means, and adjust the predetermined time and predetermined number of enabled ports in accordance with the changes in the switch memory means.

In order to further optimize the switch, the Ingress Function means is further given the ability to detect if the client attached to the associated port has data to transfer. Thus when the Bandwidth Control means selects a port to be enabled, it first checks the associated Ingress Function means to determine if that port has data to transfer. If the port has data to transfer, then the associated Ingress Function means is enabled. If the port does not have data to transfer, the associated Ingress Function means is skipped and the next port in the order is selected. This continues, until a port is found that has data to transmit or the Bandwidth Control means has checked every port in the order. If every port does not have data to transmit, the Bandwidth Control means waits and then restarts the process.

When the associated port is using a carrier/collision protocol, the associated Ingress Function means asserts a carrier of this protocol when each Ingress Function means is disabled. In half duplex mode, the Ingress Function means waits until an end of the packet presently being received before asserting the carrier. When the associated port is in full duplex mode, the associated Ingress Function means sends a flow control message to disable data transfer from the client.

This exerts the back pressure onto the client, and once the client has finished transmitting, the Ingress Function means generates the "done" signal to the Bandwidth Control means. The time between starting the disable procedure and the generation of the "done" signal can vary depending on how long it takes the client to recognize the back pressure and finish transmitting packets already in progress.

If the protocol connecting the client to the port does not have a back pressure option, then the data transferred from the client to the disabling of the port is discarded. As an alternative, a small port memory can be included with the Ingress Function means to temporarily store the data while the port is disabled. The port memory means is preferably relatively small, and once the port memory means has been filled, additional data is discarded. This implementation does not prevent packet loss, but can smooth small traffic bursts.

In the preferred embodiment, the switch of the present invention has a plurality of dual speed Ethernet client ports and at least one high speed Ethernet uplink port. The combined data rate of the Ethernet dual speed client ports has a maximum value which is higher than the data rate of the Ethernet uplink port. The Bandwidth Control means limits the number of enabled Ethernet client ports so that the combined data rate of the enabled client ports substantially equals, or just slightly exceeds the data rate of the uplink port. In this way the speed and amount of switch memory can be minimized in the switch itself and the memory burden is divided among the clients. The dividing of the memory burden greatly reduces the magnitude of a worst case scenario and allows each client to individually chose the amount of memory to smooth out traffic bursts based on its own cost/benefit situation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
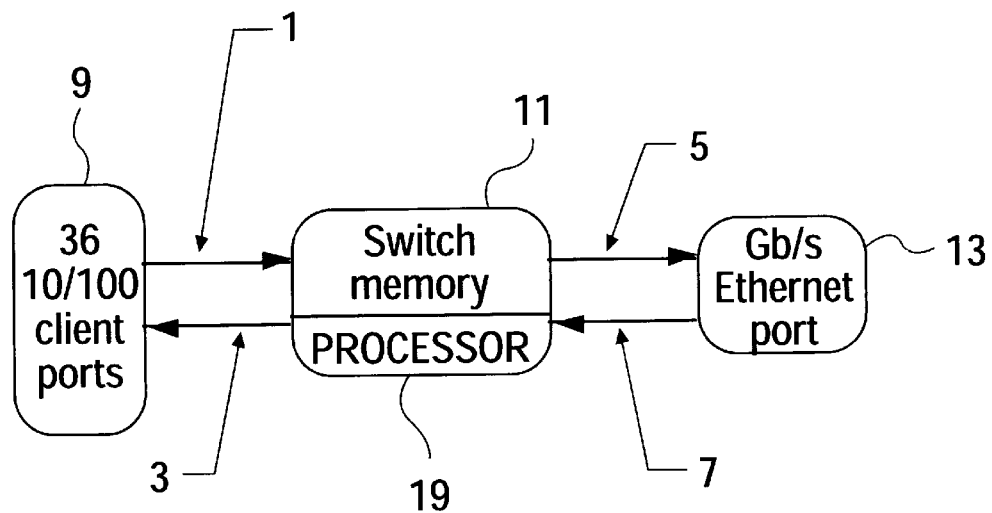
FIG. 1, is a schematic diagram of the ports and memory of the switch.
Figure 2:
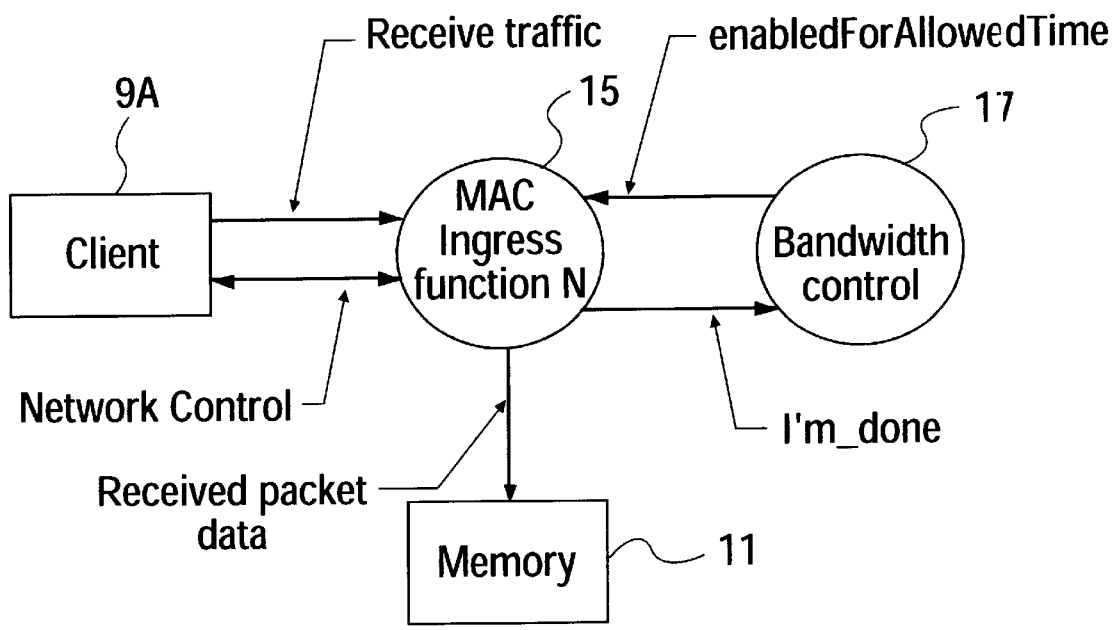
FIG. 2, is a functional diagram of the present invention in a first embodiment.

Referring to the drawings, in particular to FIG. 1, the switch of the present invention is an Ethernet switch having 36 Ethernet client ports 9, where each of the ports is preferably either 10 Mb/s or 100 Mb/s. The client ports 9 transfer data to the switch memory means 11 over a path 1. A processor 19 analyzes the packets in the switch memory 11 and determines on which of the ports the packets should be sent out on. The path 1 has a maximum data rate of 3.6 Gb/s if all of the 36 client ports 9 are transmitting data simultaneously and are transmitting at the higher 100 Mb/s rate. The switch also has an uplink Ethernet port 13 which operates at 1 Gb/s. The path 5 from the switch memory means 11 to the uplink Ethernet port 13 transfers data at one gigabit or Gb/s. Likewise the path 7 from the uplink port 13 to the switch memory means 11 also transfers data at 1 Gb/s. The switch of the present invention primarily transfers data from the client port to the uplink port and vice versa. Therefore, there is a possibility of 3.6 Gb/s going into the switch memory means 11 along path 1 and only one Gb/s leaving the switch memory means 11 along path 5. In a worst case scenario, this would require the switch memory means 11 to be rather fast and large in order not to drop any data and require higher level protocols to re-request data.

The present invention applies flow control to the client ports 9 to have the data rate on path 1 to be substantially equal, or slightly greater, than the data rate of the uplink port 13.

When designing a blocking switch it may be advantageous to only provide enough bandwidth for the steady state device throughput and not worst case short term bandwidth. The bandwidth control mechanisms can decrease the switch memory device bandwidth requirements. FIG. 1 illustrates a memory bandwidth requirement ranging from 4 Gb/s to 6.6 Gb/s. This represents a 41.25% increase.

If the bandwidth of received packets is controlled to maintain a maximum possible input rate of one gigabit then a memory system with 4 Gb/s bandwidth will suffice. When packet based flow control is used, the actual bandwidth used may be less than maximum allowed. Bandwidth control will limit the data rate to less than 2 Gb/s as the maximum allowed from client ports to switch memory. Without a flow control mechanism, the switch would have to provide sufficient memory bandwidth and depth such that higher level protocols operate efficiently. The resultant memory system bandwidth requirement would be 4.5–5 Gb/s. Without sufficient memory and flow control, packets would be dropped in a haphazard manner and higher level protocol would operate inefficiently.

In the switch, each client 9A has an associated Ingress Function means 15. The associate Ingress Function means either receives the data from the client 9A directly, and forwards it to the switch memory means 11, or at least controls the flow of data from the client 9A to the switch memory means 11. The Ingress Function means 15 can selectively pass and block data from the clients 9A to the switch memory means 11. A Bandwidth Control means 17 selectively controls a plurality of Ingress Function means 15. The Bandwidth Control means 17 determines how many of the clients 9A can be enabled to transfer data to the switch memory means 11. The Bandwidth Control means 17 then sends a signal to selected Ingress Function means 15, to enable the Ingress Functions means to transfer data from their associated client 9A to the switch memory means 11. This enabling of the selected Ingress Function means 15 is only permitted for a predetermined amount of time. After this predetermined amount of time has expired, the selected Ingress Function means 15 are disabled, and another selected predetermined number of Ingress Function means 15 and their associated ports or clients are enabled. The Bandwidth Control means 17 only enables a predetermined number of the Ingress Function means 15 at one time, in order to limit the Bandwidth and the amount of data thrown into the switch memory means 11. The Bandwidth Control means 17 selectively enables all of the Ingress Function means 15 at various times during the operation in order to give all the clients 9A access to the switch memory means 11 and thus the uplink port 13.

If the client ports 9A all sent equal size packets on all ports and the packets start at the same regular intervals t1–t8, then the following Table 1 illustrates the preemptive flow control scheme. This example is for a six client port device where only two ports can be serviced at one time.

But this is not representative of real packet based Ethernets. In actual operation packets of data have a variable length, and can start and stop at any time.

When the predetermined time for a port to be enabled has expired, a client 9A may be sending a data packet to the switch. If no more data was sent to the switch memory after the elapsed predetermined time, the packet would be incompletely received and this would make the entire packet useless. Higher level protocols would detect this packet as being invalid and request that the entire packet be resent. Therefore the Ingress Function means 15 will not immediately disable the transfer of data to the switch means once the predetermined time has elapsed, but instead will wait until the present packet is completely transferred. Once the packet has been completely received, and the predetermined time has elapsed, the Ingress Function means 15 transmits a "done" or "finished" signal to the Bandwidth Control means 17. The Bandwidth Control means 17 recognizes the "done" signal and then enables another port of the switch. This is done continuously to give each port access to the switch memory, and to limit the incoming data rate without receiving incomplete packets due to the asynchronous nature of actual operation.

The Bandwidth allocation scheme of the present invention provides bandwidth allocation to all client ports 9 and guarantees the sum of all the bandwidth from the client ports 9 will not exceed a specified maximum memory bandwidth. The partitioning was chosen to allow the Ingress Function means to vary based on client link capabilities. Client links are dynamic because the capabilities are negotiated each time a client is attached. This partitioning allows the Bandwidth Control to be de-coupled from the client link capabilities.

The MAC Ingress function means 15 receives packets from the connected client, may assert back pressure on the client to prevent packet transmission, and transfers the received packets into memory. The MAC Ingress function has an input which enables reception and transfer of packet to memory for a predetermined time period specified by

TABLE 1

| port # | t1 | t2 | t3 | t4 | t5 | t6 | t7 | t8 |
|---|---|---|---|---|---|---|---|---|
| 1 | block | enable | enable | block | block | block | block | enable |
| 2 | block | block | enable | enable | block | block | block | block |
| 3 | block | block | block | enable | enable | block | block | block |
| 4 | block | block | block | block | enable | enable | block | block |
| 5 | enable | block | block | block | block | enable | enable | block |
| 6 | enable | enable | block | block | block | block | enable | enable |

Table 1 shows a staggered approach where each port gets enabled for two time slots t out of 6 time slots. A non-staggered approach could also be used and is shown in Table 2 below.

"enabledForAllowedTime". When the "enabledForAllowedTime" time period has expired and when the MAC Ingress function means 15 can guarantee no more packets

TABLE 2

| port # | t1 | t2 | t3 | t4 | t5 | t6 | t7 | t8 |
|---|---|---|---|---|---|---|---|---|
| 1 | block | block | enable | enable | block | block | block | block |
| 2 | block | block | enable | enable | block | block | block | block |
| 3 | block | block | block | block | enable | enable | block | block |
| 4 | block | block | block | block | enable | enable | block | block |
| 5 | enable | enable | block | block | block | block | enable | enable |
| 6 | enable | enable | block | block | block | block | enable | enable | will be transferred to memory, then an "I'm_done" signal is returned to the Bandwidth control function means 17.

The Bandwidth control function controls the plurality of Ingress function means 15 associated with each of the client ports 9. The following algorithm, executed by the bandwidth control function, assures that no more than a maximum amount of traffic is transferred to memory.

All client ports initialize in the disabled state.
Determine the set of client ports that will not be controlled (always enabled)
Calculate remaining bandwidth
Calculated maxActivePorts
Create port_number_fifo containing all the client port numbers to be controlled.
Set ports_active to zero.

```
Do
    If ports_active < maxActivePorts then
        Dequeue port number from port_number_fifo
        Enable that port for enableForAllowedTime time period
        Increment ports_active
    Else
        wait TBD time
    end if
    Read all ports for an I'm_done indication
    If a port has indicated I'm_done then
        enqueue that port number in port_number_fifo
        decrement ports_active
    end if
Until forever
```

This algorithm is simple but bandwidth is allocated to client ports even when they have no packets to transfer to memory. This can lower performance by lowering throughput and increase latency.

Figure 3:
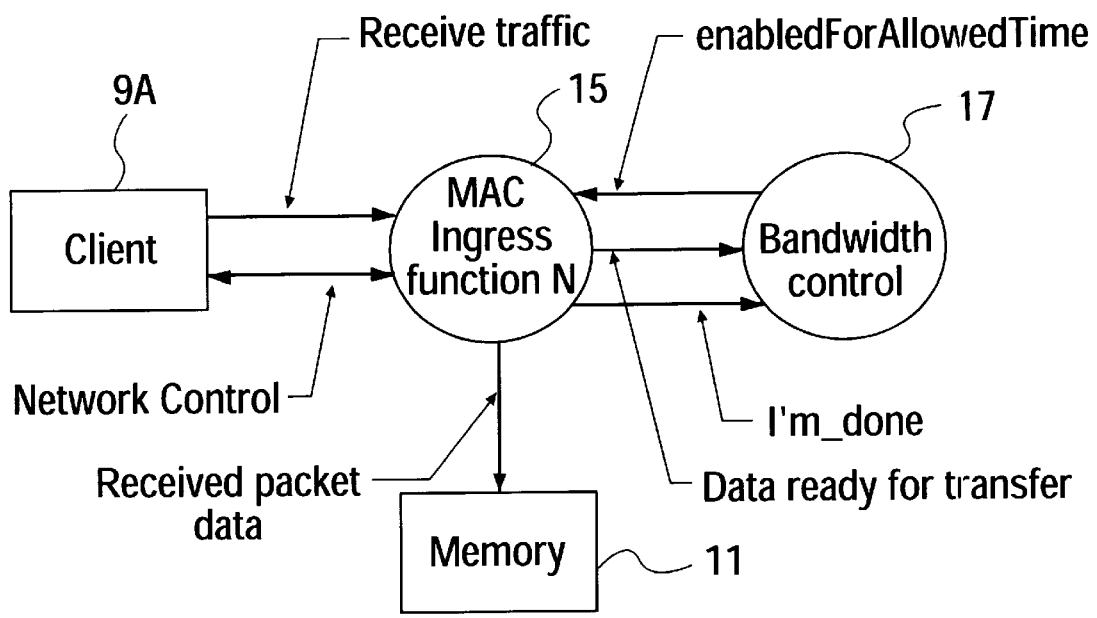
FIG. 3, is a functional diagram of the present invention in a second embodiment.

In another embodiment of the present invention, the Ingress Function means 15 senses when an attached client 9A has data to transmit to the switch. The Ingress Function means 15 is able to report this to the Bandwidth Control means 17 as a separate signal, as shown in FIG. 3. When one of the Ingress Function means 15 has just generated a "done" signal, the bandwidth control means then selects the next Ingress Function means 15 in the order. The Bandwidth Control means checks this next Ingress Function means 15 to determine if the corresponding client 9A has data ready to transfer. If the associated client 9A does have data ready for transfer, the corresponding Ingress Function means 15 is enabled and the client 9A transfers data to the switch memory means 11. If the Bandwidth Control means 17 does not receive an indication from the next Ingress Function means in the order, the Bandwidth Control means skips that one and goes on to the one after that. The same process is applied to all the Ingress Function means in the order until either a client 9A is found which has data to transfer or the entire order has been checked. If the entire order has been checked, the Bandwidth Control means waits for a specific amount of time and then goes through the order again. The algorithm that implements this embodiment where a bandwidth is only allocated to ports that have packets to transfer to the Switch Memory means is listed below.

All client ports initialize in the disabled state.
Determine the set of client ports that will not be controlled (always enabled)
Calculated maxActivePorts
Create port number_fifo containing all the client port numbers to be controlled.
Set ports_active to zero.

```
Do
    If ports_active < maxActivePorts then
        Set port_number_found to false
        Do
            Dequeue port number from port_number_fifo
            If port number has data to transfer
                Enable that port for enableForAllowedTime
                    time period
                Increment ports_active
                Set port_number_found to true
            Else
                enqueue port number at the end of the FIFO
            end if
        Until port_number_found or one pass through the FIFO
    Else
        wait TBD time
    end if
    Read all ports for an I'm_done indication
    If a port has indicated I'm_done then
        enqueue that port number in port_number_fifo
        decrement ports_active
    end if
Until forever
```

Three implementation options are examined for the Ingress Function means to control the ports. Two implementation options use back pressure techniques that prevent packet loss and the third option may lose packets when back pressure is not supported on a full duplex client link.

Preemptive flow control on half duplex Ethernet client ports

Figure 4:
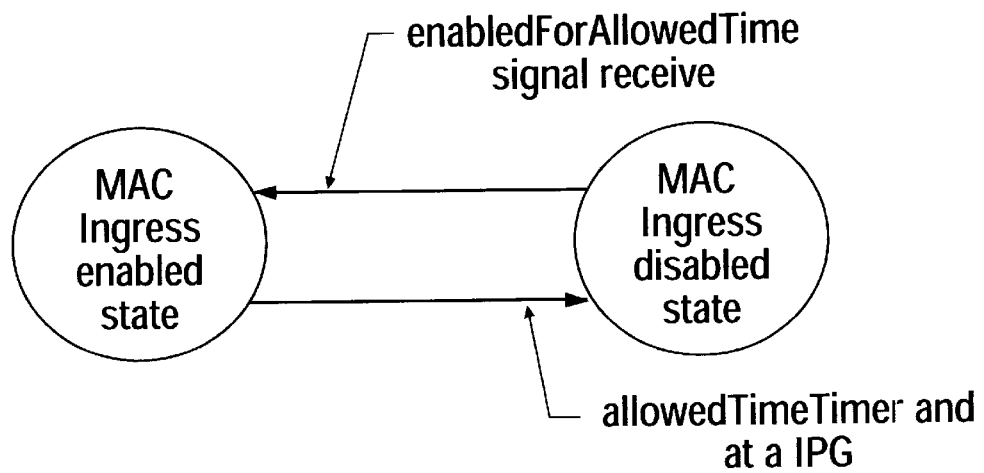
FIG. 4, is a state diagram for preemptive flow control on half duplex Ethernet client ports.

Carrier/Collision based flow control can be used to disable the attached client from transmitting. When the port is disabled from receiving, the carrier will be asserted to keep the client deferring. Care must be taken to not hold carrier asserted for too long. When the MAC ingress function means 15 receives an "enableForAllowedTime" signal, the carrier is de-asserted and a timer is started. Until the timer expires, received packets can be transferred into memory. When the timer expires, any packet in the process of being received is completed, the carrier is asserted, "I'm done" is signaled, and the port enters the disabled state. This implementation prevents packet loss. FIG. 4 illustrates the disabled and enabled states of the MAC Ingress function in a state diagram.

Preemptive flow control on full duplex Ethernet

Figure 5:
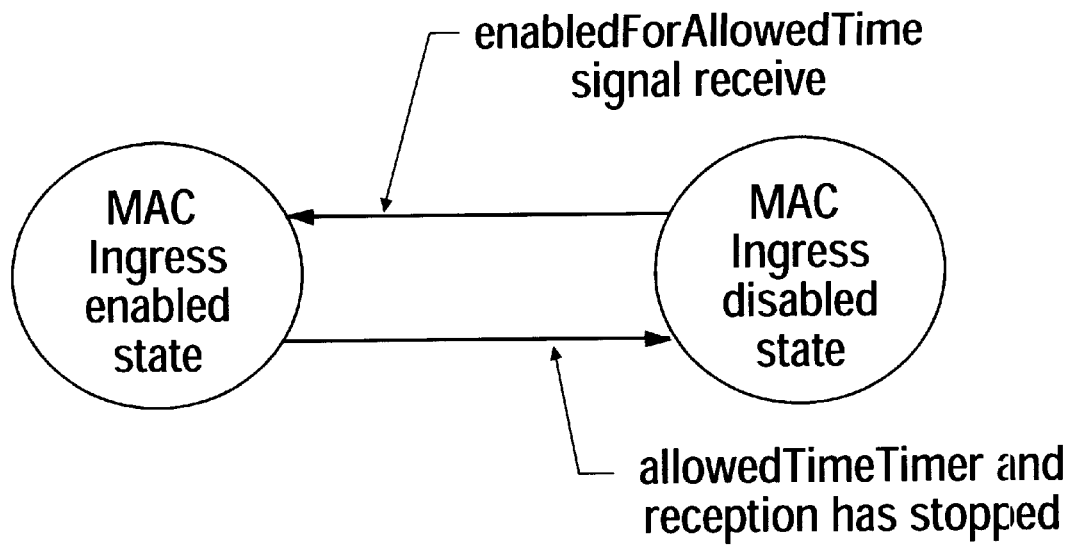
FIG. 5, is a state diagram for preemptive flow control on full duplex Ethernet client ports.

Packet based flow control can be used to disable the attached client 9A from transmitting. When the MAC Ingress function means 15 is to be disabled from receiving, a flow control message is sent and enough time has been given to assure the client will not transmit. Care must be taken to not hold off the client for too long (approximately ½ second is the max xoff time). When the MAC ingress function means 15 receives an "enableForAllowedTime" signal, an "xon" signal is sent and a timer is started. Until the timer expires, received packets can be transferred into memory. When the timer expires (or a short time before the timer expires) an "xoff" signal is sent and any packet(s) in the process of being received are completed. When reception has stopped, "I'm_done" is signaled and the port enters the disabled state. This implementation prevents packet loss. The state diagram of FIG. 5 illustrates the disabled and enabled states of the MAC Ingress function.

MAC Ingress FIFOs without flow control

Figure 6:
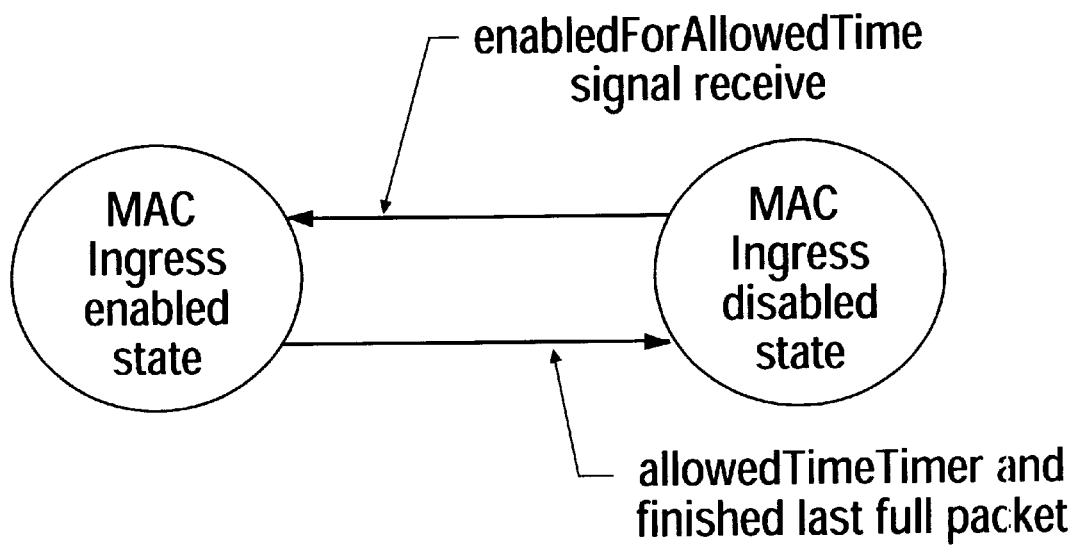
FIG. 6, is a state diagram of the Ingress Function means for ports or clients without flow control.

If back pressure can not be applied to a port to prevent the client from transmitting, then a small port memory in the form of a FIFO memory is preferably provided by the MAC Ingress function means 15 to minimize, but not prevent, packet loss. When the port is disabled from receiving, packets will be held in the FIFO and not transferred to memory. If the FIFO fills, then packets are dropped. Only full packets are stored in the FIFO. When the ingress function means 15 receives an "enableForAllowedTime" signal, any packets in the FIFO are transferred to the switch memory means 11. Until the timer expires, received packets can be transferred into memory. When the timer expires, any packet in the process of being received is completed, "I'm__ done is signaled", and the port enters the disabled state. This implementation does not prevent packet loss but can smooth small traffic bursts. The state diagram of FIG. 6 illustrates the disabled and enabled states of the MAC Ingress function.

In the preferred embodiment with 36 client ports 9, the ports can either be 10 Mb/s or 100 Mb/s. If all the ports are 10 Mb/s, then the combined data rate is 360 Mb/s, and this is well below the 1 Gb/s of the uplink port. In this case flow control is not needed. All of the previous algorithms do not flow control the 10 Mb/s client ports, and simply subtract the maximum bandwidth used by these ports from the 1 Gb/s Memory Bandwidth. The 10 Mb/s client ports are treated as shown in table 3.

TABLE 3

| | |
|---|---|
| 1–10 10 Mb/s Client ports | Treat as one Fast Ethernet that never gets flow controlled |
| 11–20 10 Mb/s Client ports | Treat as two Fast Ethernets that never gets flow controlled |
| 21–29 10 Mb/s Client ports | Treat as three Fast Ethernets that never gets flow controlled |
| 30–36 10 Mb/s Client ports | Flow control is not needed |

While specific embodiments of the invention have been shown and described in detail to illustrate the application of the principles of the invention, it will be understood that the invention may be embodied otherwise without departing from such principles.

What is claimed is:

1. A method for bandwidth control in an over subscribed computer network switch, the method comprising:

providing a computer network packet switch with a plurality of ports and switch memory for storing packets received from said ports;

analyzing one of said packets from said switch memory to determine on which of said ports said one packet should sent out;

determining a predetermined number of said ports to be active at one time based on size of said memory;

selectively enabling each of said ports to receive data for a predetermined time, said selective enabling only enabling a predetermined number of said ports at one time.

2. A method in accordance with claim 1, wherein:

said predetermined number is less than a number of said ports.

3. A method in accordance with claim 1, wherein:

said selectively enabling uses one of a variably weighted order and a round robin order.

4. A method in accordance with claim 1, wherein:

said selectively enabling includes said each port applying back pressure to a respective client.

5. A method in accordance with claim 1, wherein:

said selective enabling varies a magnitude of said predetermined time and said predetermined number based on conditions of the switch memory.

6. A method in accordance with claim 1, wherein:

said selective enabling only enables ports connected to clients with data to transmit to the switch.

7. A method in accordance with claim 4, further comprising:

receiving the data at the ports in a plurality of packets;

finishing storing a last packet received when said predetermined time has expired;

transmitting a "done" signal when said last packet is fully stored;

applying said back pressure when said last packet is fully stored.

8. A method in accordance with claim 1, further comprising:

receiving the data at said ports using a carrier/collision protocol;

asserting a carrier of said protocol for each said port when said each port is disabled;

de-asserting said carrier for said each port when said each port is enabled.

9. A method in accordance with claim 1, further comprising:

receiving the data in a full duplex mode;

sending a flow control message from each said port when said each port is to be disabled.

10. A method in accordance with claim 1, further comprising:

discarding the data received by said one of said ports when said one port is disabled.

11. A method in accordance with claim 1, further comprising:

providing a port memory for one of said ports;

said one port storing data received when said one port was disabled in a corresponding port memory;

discarding the data received by said one port when said one port is disabled and said corresponding port memory is full.

12. A method in accordance with claim 1, further comprising:

operating said each of said ports as Ethernet client ports at a first data rate;

providing an Ethernet uplink port transmitting data at a second data rate, said second data rate being larger than said first data rate;

said selective enabling controlling said ports to form a combined data rate of said plurality of ports to be substantially equal to said second data rate.

13. A switch for bandwidth control in an over subscribed computer network, the switch comprising:

a plurality of ports;

switch memory for storing packets received from said ports;

a processor analyzing one of said packets from said switch memory to determine on which of said ports said one packet should sent out;

a plurality of Ingress Function means, each of said Ingress Function means being associated with one of said ports, said each Ingress Function means controlling data from said associated port to said switch memory means;

Bandwidth Control means for selectively enabling said each Ingress function means for a predetermined time to have said selected Ingress Function means store data in said switch memory means, said Bandwidth Control means only enabling a predetermined number of said Ingress Function means at one time based on a size of said switch memory.

14. A switch in accordance with claim 13, wherein:

said predetermined number is less than a number of said ports.

15. A switch in accordance with claim 13, wherein:

said Bandwidth control means selectively enables said each Ingress Function means using one of a variably weighted order and a round robin order.

16. A switch in accordance with claim 13, wherein:

each Ingress Function means causes a respective said port to apply back pressure to a respective client to control data as indicated by said bandwidth control means.

17. A switch in accordance with claim 13, wherein:

said Bandwidth Control means varies a magnitude of said predetermined time and said predetermined number based on conditions of said switch memory means.

18. A switch in accordance with claim 13, wherein:

said each Ingress Function means reports to said Bandwidth Control when a client connected to said associated port has data to transmit to the switch;

said Bandwidth Control only enables said Ingress function means associated with clients having data to transmit to the switch.

19. A switch in accordance with claim 13, wherein:

each of said ports receives the data in a plurality of packets;

said Ingress Function means finishes storing a last packet received when said Bandwidth control means disables said Ingress Function means, and said Ingress Function means transmits a "done" signal to said Bandwidth Control means when said last packet is fully stored;

said ports apply back pressure to a respective client when said last packet is fully stored.

20. A switch in accordance with claim 13, wherein:

one of said ports uses a carrier/collision protocol;

said Ingress Function means associated with said one port asserts a carrier of said protocol when said associated Ingress Function means is disabled and de-asserts said carrier when said associated Ingress Function means is enabled.

21. A switch in accordance with claim 13, wherein:

one of said ports uses a full duplex protocol;

said Ingress Function means associated with said one port sends a flow control message to said associated port when said associated Ingress Function means is disabled.

22. A switch in accordance with claim 13, wherein:

one of said Ingress Function means discards data received by said associated port when said one Ingress Function means is disabled.

23. A switch in accordance with claim 13, wherein:

one of said Ingress Function means includes a port memory means for storing data received when said one Ingress Function means is disabled, said one Ingress Function means discarding data received when said one Ingress Function means is disabled and said corresponding port memory means is full.

24. A switch in accordance with claim 13, wherein:

said each of said ports are Ethernet client ports operating at a first data rate;

an Ethernet uplink port is connected to said switch memory means and transmits data at a second data rate, said second data rate being larger than said first data rate;

said Bandwidth Control means controlling said Ingress Function means to form a combined data rate of said plurality of ports to be substantially equal to said second data rate.

25. A switch in accordance with claim 13, wherein:

said ports are capable of receiving data at a first and second speed, said first speed being less than said second speed;

said Bandwidth control means not controlling said ports receiving at said first speed when input bandwidth is less than output bandwidth.

* * * * *